United States Patent
Schmid et al.

(10) Patent No.: US 8,435,665 B2
(45) Date of Patent: May 7, 2013

(54) DEVICE FOR COOLING A VEHICLE BATTERY

(75) Inventors: Caroline Schmid, Stuttgart (DE);
Tobias Isermeyer, Loewenstein (DE);
Markus Kohlberger, Stuttgart (DE);
Florian Moldovan, Stuttgart (DE);
Thomas Schiehlen, Altheim (DE);
Herbert Damsohn, Aichwald (DE);
Martin Steinbach, Waiblingen (DE);
Hans-Georg Herrmann, Stuttgart (DE);
Juergen Eckstein, Schwaikheim (DE)

(73) Assignee: BEHR GmbH & Co. KG, Stuttgart (DE)

( * ) Notice: Subject to any disclaimer, the term of this patent is extended or adjusted under 35 U.S.C. 154(b) by 0 days.

(21) Appl. No.: 12/972,358

(22) Filed: Dec. 17, 2010

(65) Prior Publication Data

US 2011/0206966 A1  Aug. 25, 2011

Related U.S. Application Data

(63) Continuation of application No. PCT/EP2009/004292, filed on Jun. 15, 2009.

(30) Foreign Application Priority Data

Jun. 17, 2008 (DE) .......................... 10 2008 028 400

(51) Int. Cl.
*H01M 10/50* (2006.01)
(52) U.S. Cl.
USPC .............. 429/120; 429/71; 429/72; 429/129; 429/135; 429/148

(58) Field of Classification Search .................... 429/62, 429/71, 72, 120, 136, 138, 158–161
See application file for complete search history.

(56) References Cited

U.S. PATENT DOCUMENTS

| | | | |
|---|---|---|---|
| 4,947,287 A | 8/1990 | Hoppe | |
| 5,756,227 A | 5/1998 | Suzuki et al. | |
| 2002/0195237 A1* | 12/2002 | Luz et al. | ...................... 165/153 |
| 2004/0021442 A1* | 2/2004 | Higashino | ...................... 320/112 |
| 2006/0216582 A1 | 9/2006 | Lee et al. | |
| 2009/0059528 A1 | 3/2009 | Damsohn et al. | |

FOREIGN PATENT DOCUMENTS

| | | |
|---|---|---|
| DE | 74 39 582 U1 | 4/1975 |
| DE | 10 2007 009 315 A1 | 8/2007 |
| DE | 10 2006 045 564 A1 | 4/2008 |
| EP | 1 271 085 A2 | 1/2003 |
| EP | 1 835 251 A1 | 9/2007 |
| GB | 776240 | 6/1957 |
| JP | 2007-273774 | 10/2007 |

* cited by examiner

*Primary Examiner* — Patrick Ryan
*Assistant Examiner* — Ben Lewis
(74) *Attorney, Agent, or Firm* — Muncy, Geissler, Olds & Lowe, PLLC

(57) ABSTRACT

A device for cooling a vehicle battery is provided that includes a plurality of electric storage elements, and a cooling body being flowed through by a coolant fluid, wherein at least one of the electric storage elements is fixed at least on one cooling plate in thermal contact, and wherein the cooling plate is connected to the cooling body so that heat may be transferred from the storage element to the fluid, wherein the cooling plate has a planar mechanical connection to the cooling body.

21 Claims, 5 Drawing Sheets

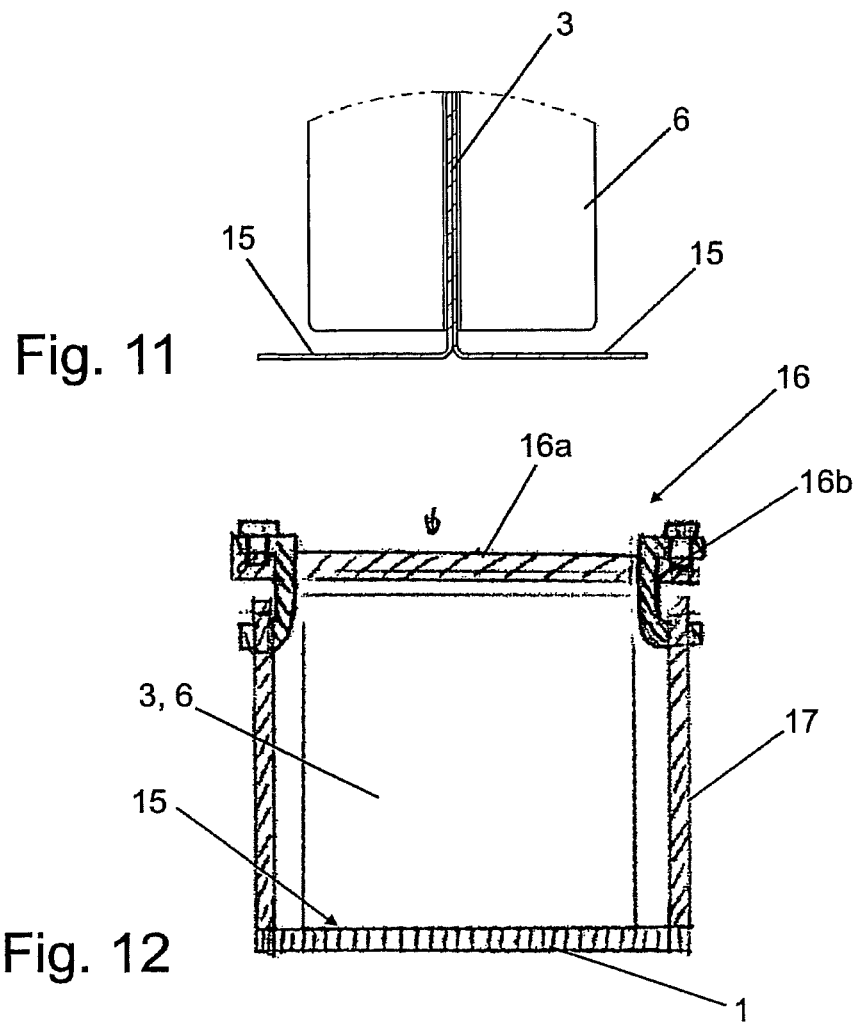
Fig. 11
Fig. 12
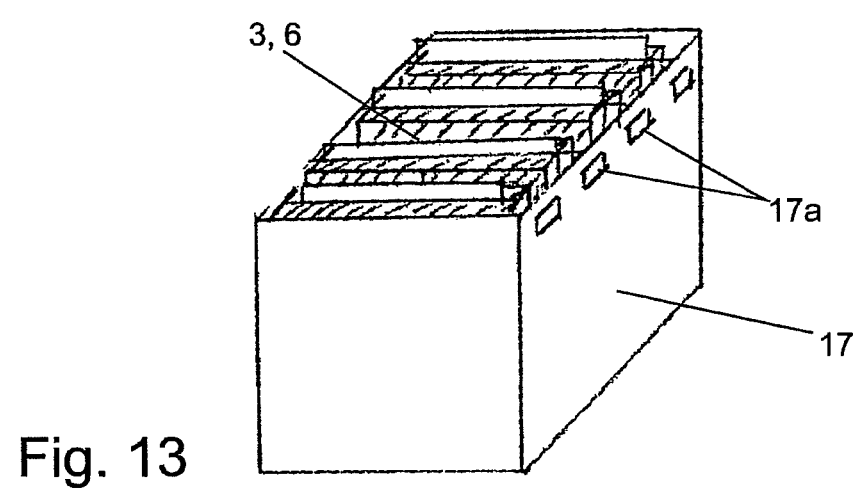
Fig. 13

DEVICE FOR COOLING A VEHICLE BATTERY

This nonprovisional application is a continuation of International Application No. PCT/EP2009/004292, which was filed on Jun. 15, 2009, and which claims priority to German Patent Application No. DE 10 2008 028 400.9, which was filed in Germany on Jun. 17, 2008, and which are both herein incorporated by reference.

BACKGROUND OF THE INVENTION

1. Field of the Invention

The present invention relates to a device for cooling a vehicle battery.

2. Description of the Background Art

The cooling of electrical energy storage devices of modern motor vehicles poses special demands on account of the sometimes high power density. Such energy storage devices can be used as batteries for electric or hybrid vehicles, among other uses. These can be lithium-ion batteries, supercaps, fuel cells, conventional rechargeable batteries, or combinations of such elements. A number of proposals for efficient cooling of such components are known, although these are often laborious or costly to produce, or their performance is limited.

SUMMARY OF THE INVENTION

It is therefore an object of the present invention to provide a device for cooling a motor vehicle battery that can be manufactured easily and economically, and that provides effective and reliable cooling.

A full-area mechanical connection provides good thermal contact, something which is only achievable with difficulty when the cooling plates are attached to the cooling element solely by adhesive means, for example. In an embodiment, the cooling element can be an essentially plate-like body through which fluid flows, wherein the fluid can be a liquid coolant of a cooling circuit, or also a refrigerant, e.g. of a vehicle air conditioning system, which evaporates in the cooling element. Also possible is a multiple flow design of the cooling element with a coolant flow and a refrigerant flow in order to be able to provide adequate cooling output in all operating situations.

In an embodiment, the mechanical connection can be designed such that the cooling plate can be attached to the cooling element after connection to the electrical element. In this way, the production steps can be rationally separated and can be better automated. The connection of the electrical elements to the cooling plate in this design can take place by means of adhesives, clamping retention, or other means, for example. In particular, the electrical elements can be lithium-ion batteries in a flat design without an inherently rigid envelope ("coffee-bags").

To ensure adequate mechanical stiffness and thermal conductivity, the cooling plate can have a thickness between approximately 0.2 mm and approximately 2 mm. Depending on requirements, the cooling plate may comprise a plurality of sheet-metal layers, which makes it possible to achieve good flexibility with an overall cross-section that is still adequate. It is generally preferred for the cooling plates to be made of a material that has good thermal conductivity while also being formable, such as aluminum, copper, or copper-coated aluminum, for instance.

In an embodiment of the invention, the cooling element can have an opening, wherein the cooling plate extends at least partway through the opening. It is especially preferred in this design for provision to be made for a part of the cooling plate that projects beyond the side of the cooling element opposite the electrical element to be deformed for mechanical connection, in particular force-locking and/or frictional and/or interlocking connection, with the cooling element. The attachment by means of deformation of the cooling plate makes it possible to achieve good thermal contact along with permanent, reliable attachment to the cooling element.

In a variation of the exemplary embodiment, the mechanical joining is accomplished with a sheet-metal part arranged on the cooling element, in particular by forming the cooling plate and the sheet-metal part together. In this variation, the sheet-metal part (or the multiple sheet-metal parts) can be attached by means of, e.g., full-area soldering, in particular during the course of manufacturing the cooling element, by which means the sheet-metal part and the cooling element are connected reliably and in especially good thermal contact.

In the interests of good heat removal, it is preferred for the projecting part of the cooling plate to be formed directly onto the cooling element.

In an embodiment, the opening of the cooling element can have the form of a slot with an enlarged central region. The central region can have a round cross-section with, in particular, conical edges, for example, so that forming of the cooling plate onto this region of the opening produces a sort of half-shell hollow rivet whose mechanical strength and thermal connection are especially great.

In another exemplary embodiment, the cooling plate has, at its end facing the cooling element, a formation tapering in a shallow angle, wherein the formation engages in a corresponding recess of the cooling element, in particular frictionally. In a preferred detailed design, an included angle of the formation on the cooling plate is between approximately 3° and approximately 9°, in particular between approximately 5° and approximately 7°. Retention in the case of such an attachment is largely frictional, wherein the selected included angle lies in the range of the self-limiting angle of friction of the material pairing. In addition to a large contact area, this design also offers the advantage that the recess does not have to extend completely through the cooling element or be formed as an opening.

In another exemplary embodiment of the invention, the cooling plate can be connected to the cooling element by at least one rivet. Riveting also presents itself as especially suitable for achieving full-area contact between the cooling plate and cooling element that is subjected to force. In a first detailed design, the rivet is made of plastic, being economical and easily workable. In particular, a plurality of the rivets can be formed as a single piece with a plastic rail, which makes it possible to further simplify and automate assembly. Forming (deformation) of the plastic rivet heads can be accomplished by heat staking, ultrasonic welding, or other thermomechanical forming methods. In a supplementary or alternative modification, the rivet is made of metal and is designed as a blind rivet in particular. Especially high contact force of the cooling plate and cooling element, and hence especially good thermal contact, can be achieved with metal rivets.

In another embodiment of the invention, a groove is provided in the cooling element and a formation corresponding to the groove is provided on the cooling plate, wherein the cooling plate can be inserted in a force-locking manner in the groove by means of the formation. This measure makes it possible to achieve a force fit in at least two spatial directions, with large contact areas inside the groove additionally being possible. Depending on requirements, additional attachment through adhesive bonding or through resilient clamping may be present, in particular to secure against displacement in the direction of the groove.

In another embodiment of the invention, provision is made for the cooling plate to be held against the cooling element under pressure by a clamping element, which achieves good thermal contact in a simple manner. In a preferred refinement, the clamping element in this design is supported on a housing cage connected to the cooling element, wherein in particular multiple cooling plates are located in the housing cage. Assembly can be further simplified and automated by this means.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 11 shows a cross-sectional view of a cooling plate from another exemplary embodiment of the invention.

FIG. 12 shows the exemplary embodiment from FIG. 11 with cooling plate attached to the cooling element by means of a clamping element.

FIG. 13 shows a three-dimensional view of the exemplary embodiment from FIG. 12 in a partially assembled state without the clamping element.

DETAILED DESCRIPTION

Figure 1:
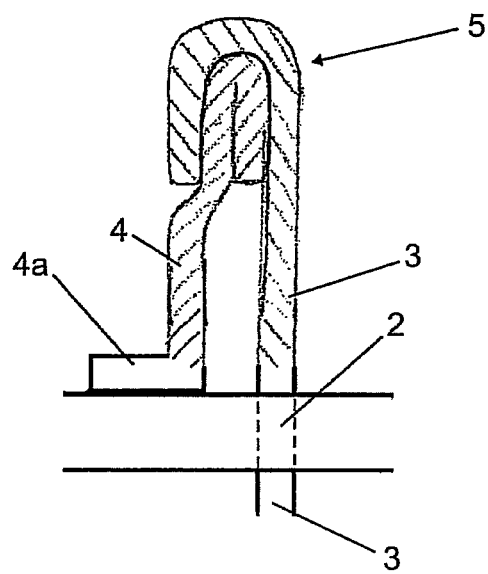
FIG. 1 shows a detail view of a first exemplary embodiment of the invention with a cooling plate that extends through the cooling element.

In the first exemplary embodiment shown in FIG. 1, a cooling element 1 that fluid flows through has a plurality of slot-like openings 2, with one cooling plate 3 inserted through each opening. Attached to the cooling plate 3 by means of adhesive are one or more lithium-ion batteries in the "coffee bag" design (not shown). The part extending through the opening 2 projects on the other side (the top in the drawing) of the cooling element, where it is joined to a sheet-metal part 4 by flanging or folding 5. The sheet-metal part 4 has a full-area, bent-back projection 4a, by means of which it is full-area soldered to the cooling element.

Due to the fact that the cooling plate 3 and sheet-metal part 4 are formed together, a force-locking, frictional, and interlocking connection is created that has good thermal conductivity. If necessary, additional sections of the cooling plate 3 may be bent back in the manner of feet and rest over their full area against the underside of the cooling element in FIG. 1.

Figure 2:
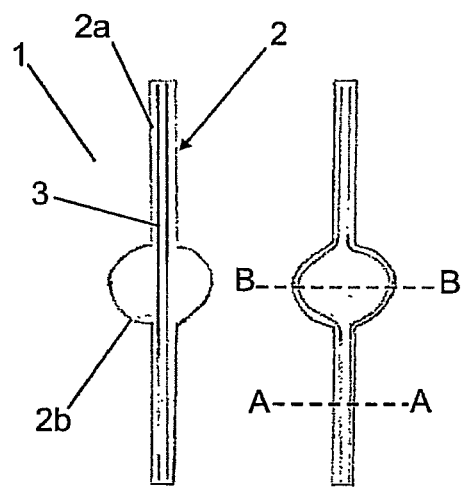
FIG. 2 shows a plan view from below of a second exemplary embodiment of the invention before and after a partial forming of the cooling plate.

FIG. 2 shows another possibility for the attachment by forming of a cooling plate that has been inserted through an opening 2 in the cooling element 1.

To this end, the opening has lateral slot-like sections 2a and a central, essentially circular section 2b with a greater width. The end region of the cooling plate that is inserted through the cooling element is divided into three segments 3a, 3b, 3c, wherein the lateral segments 3a, 3b, 3c are folded back by approximately 90 degrees and are not inserted through the slot-like sections 2a of the opening 2, but instead support the cooling plate on the cooling element over their full area. The central segment 3b that is inserted through the opening 2 is formed onto the central region of the opening 2b in the manner of a half-shell hollow rivet. Overhangs of the segment extending through the slot-like section 2a are folded back.

Figure 3:
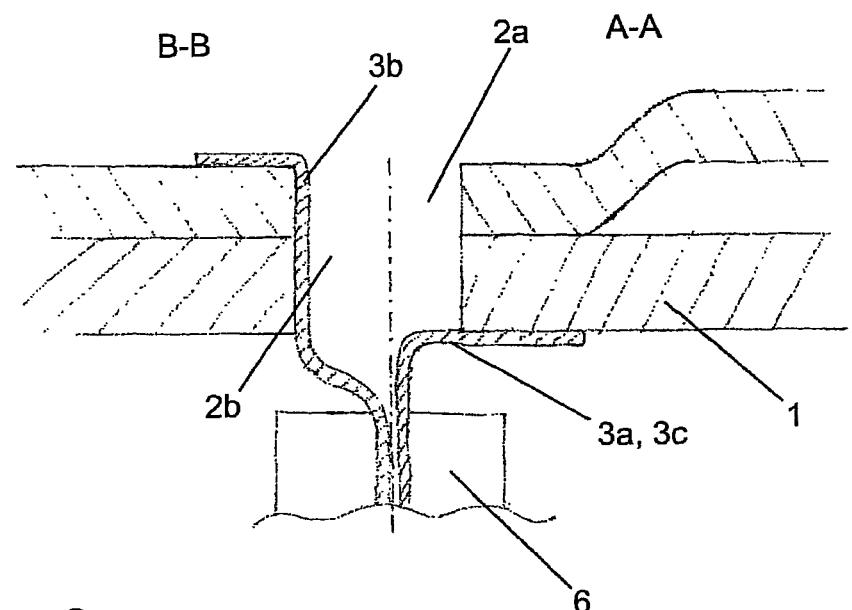
FIG. 3 shows the device from FIG. 2 in two sectional planes along the lines A-A and B-B.

For purposes of illustration, different sectional planes are shown on the left side and on the right side in the cross-sectional view in FIG. 3. Also visible are end regions of the lithium-ion cells 6 glued onto the cooling plate 3.

Figure 4:
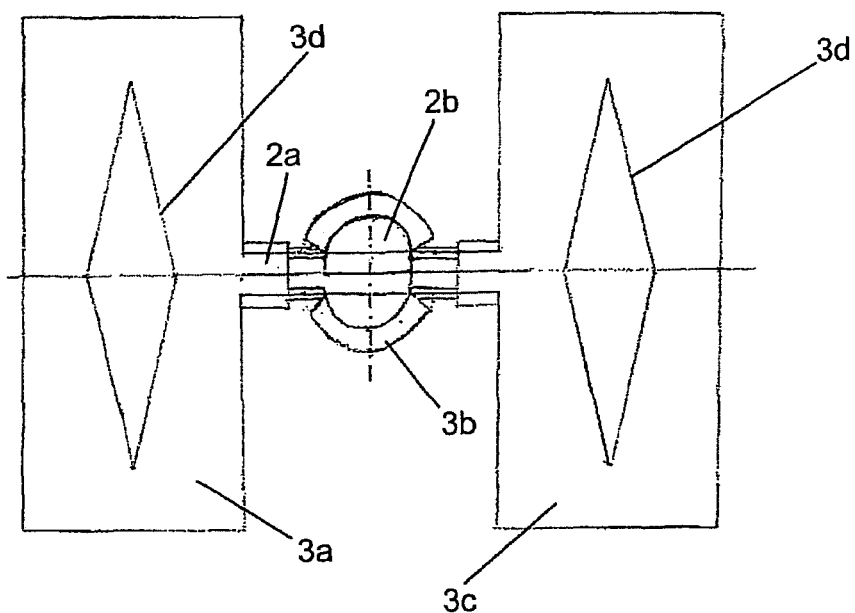
FIG. 4 shows another plan view from below of the device from FIG. 2 after complete forming of the cooling plate.

For purposes of illustration, the plan view from below in FIG. 4 also shows the segments 3a, 3c that are supported on the opposite side of the plate-like cooling element, and that would not actually be visible. The segments 3a, 3c are also provided with beading 3d for reinforcement. In the exemplary embodiment shown, two cooling plates are introduced into each opening 2, wherein this may also be two sheet-metal layers of the same cooling plate, depending on requirements. In the case of a cooling plate made of multiple layers, the layers can be joined together at their other end in a manner similar to the connecting region 5 in FIG. 1.

Figure 5:
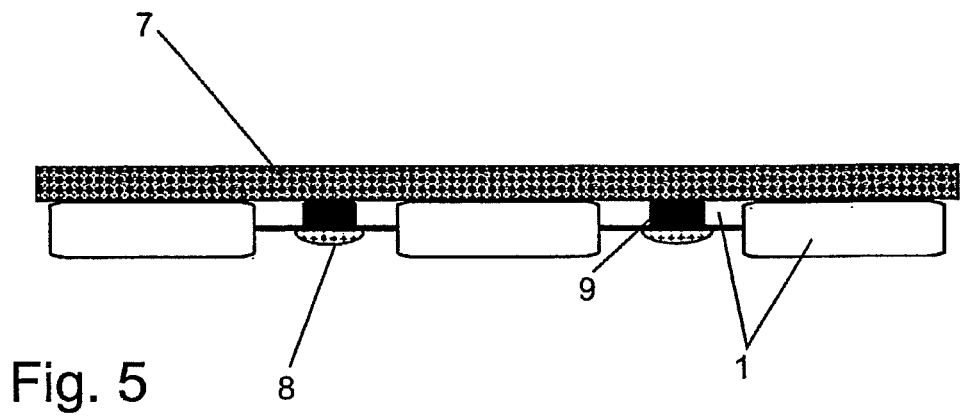
FIG. 5 shows another exemplary embodiment of the invention with riveting of the cooling plate and cooling element.

In the embodiment in FIG. 5, a plastic rail 7 is attached to the cooling plate (not shown), for example by means of clips, adhesives, or injection-molding. The plastic rail 7 has multiple projecting pins or rivets 8, which are inserted through openings 9 in the cooling element 1 and are then formed into rivet heads. The forming can take place by means of hot staking or other suitable means.

The cooling element 1 has flat tubes 1a in which refrigerant or a coolant flows. For further reinforcement, the rivets are carried in reinforcing elements 9.

Figure 6:
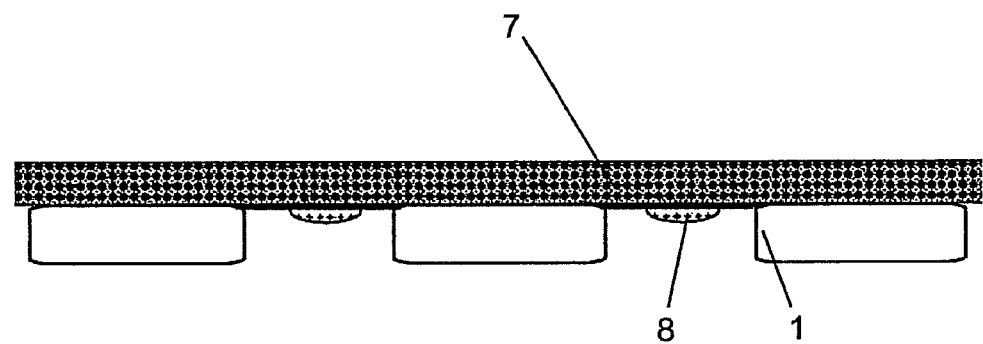
FIG. 6 shows a modification of the exemplary embodiment from FIG. 5.

FIG. 6 shows a modification of the embodiment from FIG. 5 in which no reinforcing elements are provided.

Figure 7:
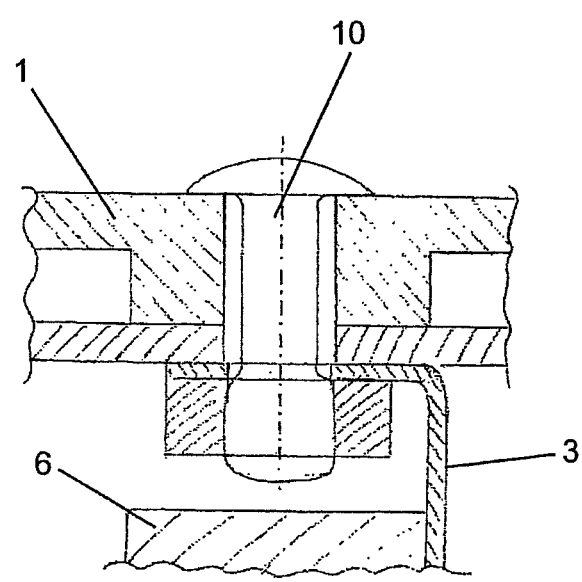
FIG. 7 shows another modification of the exemplary embodiment from FIG. 5.

FIG. 7 shows another variation of the riveting of cooling plate 3 and cooling element 1 in which a metallic blind rivet is inserted through openings in cooling element 1 from the side facing away from the electrical elements, and a tab of the cooling plate 3 resting on the cooling element 1 is inserted and then formed. This method of attachment is especially advantageous for space-limited construction, such as exists in the present example as a result of the electrical elements 6 extending over the rivet 10.

Figure 8:
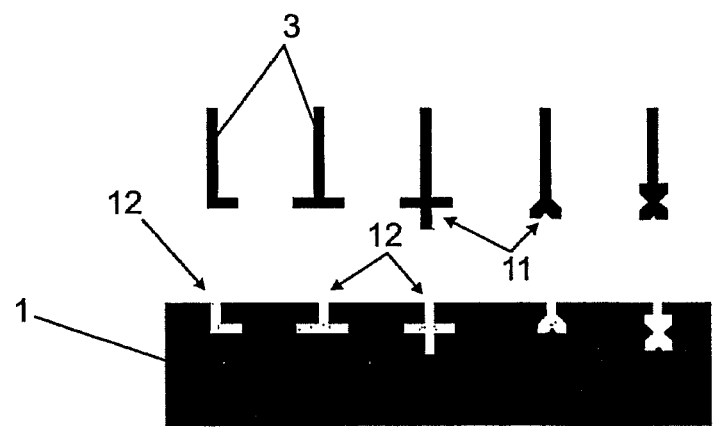
FIG. 8 shows another exemplary embodiment of the invention using interlocking grooves.

FIG. 8 schematically shows an exemplary embodiment in which a formation 11 at the end of the cooling plate 3 is inserted in an interlocking way in a corresponding groove 12 of the cooling element 1. If a friction or spring tension achieved through shaping does not provide adequate attachment in the direction of insertion, adhesive bonding or else folding back of sheet-metal parts projecting at the ends can take place in addition.

Figure 9:
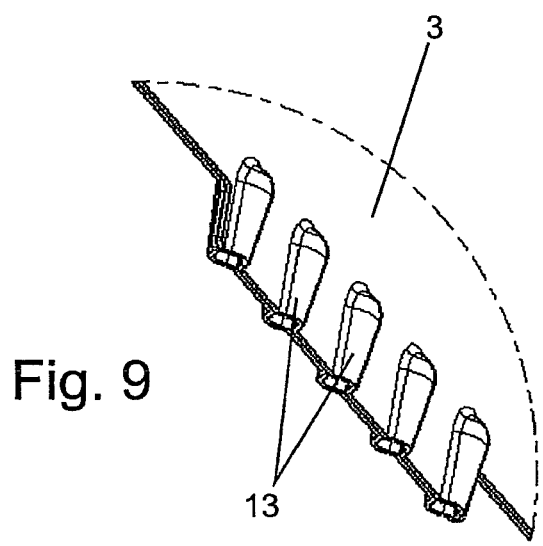
FIG. 9 shows a cooling plate of another exemplary embodiment with conical formations.
Figure 10:
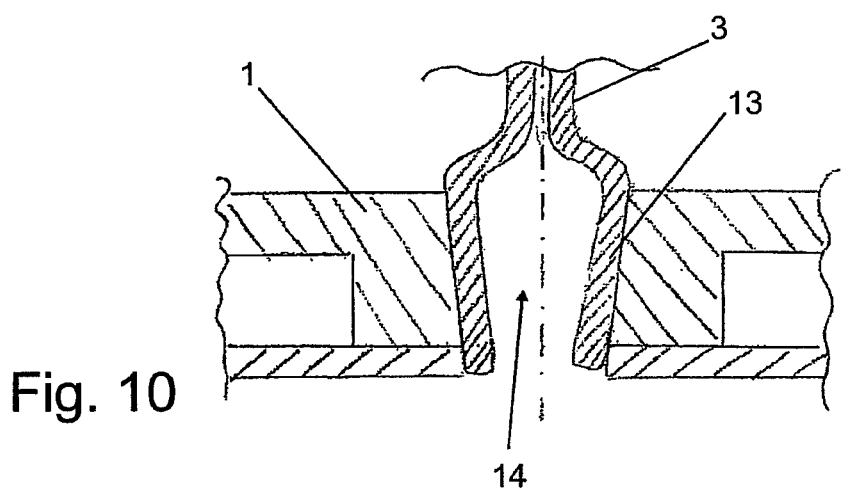
FIG. 10 shows a schematic cross-sectional view through the cooling plate from FIG. 9 attached to a cooling element.

FIG. 9 and FIG. 10 show an exemplary embodiment in which formations are provided at the ends of the cooling plate 3 that taper in a shallow angle of approximately 6° in the manner of tongues 13, which are inserted in corresponding conical recesses 14 of the cooling element 1. The recesses 14 may be present in the form of blind holes or else as openings (see FIG. 10) that pass all the way through. Permanent frictional attachment with good full-area contact can be achieved through an appropriate choice of the cone angle. Additional retention can be achieved by the subsequent application of adhesive, or else by additional locking through suitable shaping of the tongues 13.

FIG. 11 through FIG. 13 show another exemplary embodiment of the invention in which the ends of the cooling plate 3 are bent into the form of flat feet 15, which rest on the surface of the cooling element 1. At the opposite end, the cooling plates 3 are held and pressed against the cooling element 1 by a clamping element 16 in the manner of a straight clip that continuously overlaps the cooling plate, or a pressure plate 16a with resiliently elastic connecting elements 16b that are engaged at the sides.

The connecting elements 16b are connected at one side to the clips 16a and at the other side are hooked in recesses 17a of a housing cage 17 in a preloaded manner. The housing cage 17 encloses a plurality of the cooling plates 3 and is permanently attached to the cooling element 1, which can be accomplished by soldering, for example, during the course of manufacturing the cooling element 1.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device for cooling a vehicle battery, the device comprising:
    a plurality of electrical storage elements; and
    a cooling element having an interior surface defining an interior passage configured such that a cooling fluid flows therethrough, the cooling element also including an exterior surface;
    at least one cooling plate, at least one of the electrical storage elements being attached in thermal contact to the at least one cooling plate, the cooling plate being connectable to the cooling element such that heat is transmitted from the storage element to the fluid, the cooling plate having a flange forming a full-area mechanical connection to the cooling element, the flange not contacting the inner surface.

2. The device according to claim 1, wherein the cooling plate is attachable to the cooling element after connection to the electrical element.

3. The device according to claim 1, wherein the cooling plate has a thickness between approximately 0.2 mm and approximately 2 mm.

4. The device according to claim 1, wherein the cooling plate comprises a plurality of sheet-metal layers.

5. The device according to claim 1, wherein the cooling plate is connected to the cooling element by at least one rivet.

6. The device according to claim 5, wherein the rivet is made of plastic.

7. The device according to claim 6, wherein a plurality of the rivets are formed as a single piece with a plastic rail.

8. The device according to claim 5, wherein the rivet is made of metal, and is configured as a blind rivet in particular.

9. The device according to claim 1, wherein a groove is provided in the cooling element and a formation corresponding to the groove is provided on the cooling plate, and wherein the cooling plate is inserted in a force-locking manner in the groove by a formation.

10. The device according to claim 9, wherein additional securing through adhesive bonding or through resilient clamping is present.

11. The device according to claim 1, wherein the cooling plate is held against the cooling element under pressure by a clamping element.

12. The device according to claim 11, wherein the clamping element is supported on a housing cage connectable to the cooling element, and wherein a plurality of cooling plates are arranged in the housing cage.

13. The device according to claim 1, wherein the flange overlies a portion of the exterior surface.

14. The device according to claim 1, wherein the flange extends in a blind bore in the exterior surface.

15. A device for cooling a vehicle battery, the device comprising:
    a plurality of electrical storage elements; and
    a cooling element configured such that a cooling fluid flows therethrough;
    at least one cooling plate, at least one of the electrical storage elements being attached in thermal contact to the at least one cooling plate, the cooling plate being connectable to the cooling element such that heat is transmitted from the storage element to the fluid, the cooling plate having a full-area mechanical connection to the cooling element,
    wherein the cooling element has a through opening having first and second spaced ends, and wherein the cooling plate extends through the through opening.

16. The device according to claim 15, wherein a part of the cooling plate that projects beyond a side of the cooling element opposite the electrical element is deformed for mechanical connection and/or force-locking and/or frictional and/or interlocking connection, with the cooling element.

17. The device according to claim 16, wherein the mechanical joining is accomplished with a sheet-metal part arranged on the cooling element by forming the cooling plate and the sheet-metal part together.

18. The device according to claim 16, wherein the projecting part of the cooling plate is formed directly onto the cooling element.

19. The device according to claim 18, wherein the opening of the cooling element is formed as a slot with an enlarged central region.

20. A device for cooling a vehicle battery, the device comprising:
    a plurality of electrical storage elements; and
    a cooling element configured such that a cooling fluid flows therethrough;
    at least one cooling plate, at least one of the electrical storage elements being attached in thermal contact to the at least one cooling plate, the cooling plate being connectable to the cooling element such that heat is transmitted from the storage element to the fluid, the cooling plate having a full-area mechanical connection to the cooling element,
    wherein the cooling plate has at an end facing the cooling element a formation tapering in a shallow angle, and wherein the formation engages in a corresponding recess of the cooling element frictionally.

21. The device according to claim 20, wherein an included angle of the formation on the cooling plate is between approximately 3° and approximately 9°, in particular between approximately 5° and approximately 7°.

* * * * *